United States Patent
Moshchuk et al.

(10) Patent No.: US 11,192,584 B2
(45) Date of Patent: Dec. 7, 2021

(54) METHOD AND APPARATUS FOR LATERAL MOVEMENT CONTROL

(71) Applicant: GM GLOBAL TECHNOLOGY OPERATIONS LLC, Detroit, MI (US)

(72) Inventors: Nikolai K. Moshchuk, Grosse Pointe, MI (US); Kausalya Singuru, Troy, MI (US); David Andres Pérez Chaparro, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 16/578,665

(22) Filed: Sep. 23, 2019

(65) Prior Publication Data

US 2021/0086832 A1    Mar. 25, 2021

(51) Int. Cl.
| | | |
|---|---|---|
| *B62D 15/02* | (2006.01) | |
| *G05D 1/02* | (2020.01) | |
| *B62D 5/04* | (2006.01) | |
| *B62D 6/00* | (2006.01) | |

(52) U.S. Cl.
CPC ......... *B62D 15/0255* (2013.01); *B62D 5/046* (2013.01); *B62D 6/002* (2013.01); *B62D 15/021* (2013.01); *G05D 1/0212* (2013.01)

(58) Field of Classification Search
CPC .... B62D 15/0255; B62D 5/046; B62D 6/002; B62D 15/021; G05D 1/0212
See application file for complete search history.

(56) References Cited

U.S. PATENT DOCUMENTS

| | | | | |
|---|---|---|---|---|
| 4,322,670 | A * | 3/1982 | Taylor | B62D 1/28 180/168 |
| 5,694,535 | A * | 12/1997 | Broekhuijsen | G06T 11/203 345/442 |
| 6,894,771 | B1 * | 5/2005 | Dorrance | G01B 11/2755 33/203.18 |
| 7,904,222 | B2 * | 3/2011 | Lee | G01S 13/87 701/41 |
| 9,120,485 | B1 * | 9/2015 | Dolgov | B60W 30/10 |
| 9,254,866 | B2 * | 2/2016 | Dawson | B62D 7/14 |
| 9,731,755 | B1 * | 8/2017 | Moshchuk | B62D 6/00 |
| 10,360,458 | B2 * | 7/2019 | Chaney, Jr. | G06T 7/62 |

(Continued)

OTHER PUBLICATIONS

Marzbani, Hormoz & Vo, Dai & Khazaei, Ali & Fard, Mohammad & Jazar, Reza. (2017). Transient and steady-state rotation center of vehicle dynamics. Procedia Computer Science. 112. 1404-1411. 10.1016/j.procs.2017.08.064. (Year: 2017).*

(Continued)

*Primary Examiner* — Angelina Shudy
(74) *Attorney, Agent, or Firm* — Cantor Colburn LLP

(57) ABSTRACT

A method and apparatus that control lateral movement of a vehicle are provided. The method includes receiving vehicle information and path information of the vehicle, determining a center of vehicle rotation from the vehicle information, minimizing a path tracking error based on the path information of the vehicle, determining a road wheel angle command or a steering torque command using non-linear optimization based on the minimized path tracking error, and controlling an actuator according to the road wheel angle command or steering torque command.

18 Claims, 3 Drawing Sheets

(56) References Cited

U.S. PATENT DOCUMENTS

| | | | |
|---|---|---|---|
| 2004/0133338 A1* | 7/2004 | Verhagen | B60G 17/01908 701/124 |
| 2006/0241786 A1* | 10/2006 | Boe | G05B 13/042 700/29 |
| 2008/0004778 A1* | 1/2008 | Rekow | A01B 69/004 701/50 |
| 2008/0133092 A1* | 6/2008 | Hozumi | B60N 2/986 701/49 |
| 2009/0177346 A1* | 7/2009 | Hac | B60W 40/13 701/31.4 |
| 2009/0256321 A1* | 10/2009 | Suzuki | B60G 7/008 280/5.521 |
| 2011/0102166 A1* | 5/2011 | Filev | B60W 30/02 340/435 |
| 2011/0106334 A1* | 5/2011 | Filev | B60Q 1/50 701/1 |
| 2011/0106381 A1* | 5/2011 | Filev | B60W 50/08 701/40 |
| 2011/0187520 A1* | 8/2011 | Filev | B60W 40/107 340/438 |
| 2011/0224845 A1* | 9/2011 | Perry | B64F 1/22 701/2 |
| 2012/0203399 A1* | 8/2012 | Filev | B60W 30/18145 701/1 |
| 2013/0030648 A1* | 1/2013 | Matsumoto | B60W 30/02 701/37 |
| 2014/0253722 A1* | 9/2014 | Smyth | H04N 5/23296 348/135 |
| 2014/0358436 A1* | 12/2014 | Kim | G01C 21/32 701/532 |
| 2015/0336607 A1* | 11/2015 | Inoue | B60W 40/114 701/41 |
| 2016/0035223 A1* | 2/2016 | Gutmann | B60W 30/09 340/907 |
| 2016/0114809 A1* | 4/2016 | Savaresi | G01G 19/086 702/41 |
| 2017/0247032 A1* | 8/2017 | Lee | B62D 15/025 |
| 2018/0043933 A1* | 2/2018 | Hu | G06K 9/4609 |
| 2018/0057054 A1* | 3/2018 | Tokoro | B60R 11/04 |
| 2018/0354513 A1* | 12/2018 | Moshchuk | B62D 15/025 |
| 2019/0049992 A1* | 2/2019 | Riess | G05D 1/0212 |
| 2020/0062069 A1* | 2/2020 | Sorniotti | B60G 17/0162 |
| 2020/0192383 A1* | 6/2020 | Nath | B62D 6/00 |
| 2020/0269853 A1* | 8/2020 | Cui | B60W 60/00 |
| 2021/0000004 A1* | 1/2021 | Robinson | B62D 15/0295 |

OTHER PUBLICATIONS

Vehicle Dynamics Compendium for Course MMF062, Chalmers University of Technology, Bengt Jacobson (Year: 2015).*

Hormoz Marzbani, Dai Q. Vo, Ali Khazaei, M. Fard, Reza N. Jazar, Transient and steady-state rotation center of vehicle dynamics, Procedia Computer Science,vol. 112,2017,pp. 1404-1411, (Year: 2017).*

* cited by examiner

METHOD AND APPARATUS FOR LATERAL MOVEMENT CONTROL

INTRODUCTION

Apparatuses and methods consistent with exemplary embodiments relate to controlling lateral movements of a vehicle. More particularly, apparatuses and methods consistent with exemplary embodiments relate to path tracking and lateral control.

SUMMARY

One or more exemplary embodiments provide a method and an apparatus that control lateral movement of a vehicle. More particularly, one or more exemplary embodiments provide a method and an apparatus that control lateral movement of a vehicle during mild lateral acceleration movements using quasi-steady state approximations of the dynamics of a planar vehicle model.

According to an exemplary embodiment, a method that controls lateral movement of a vehicle is provided. The method includes receiving vehicle information and path information of the vehicle, determining a center of vehicle rotation from the vehicle information, minimizing a path tracking error based on the path information of the vehicle, determining a road wheel angle command or a steering torque command based on the minimized path tracking error by using non-linear optimization, and controlling an actuator according to the determined road wheel angle command or steering torque command.

The vehicle information may include one or more from among a vehicle length, a vehicle width, a vehicle mass, a vehicle forward velocity, an understeer gradient, vehicle cornering stiffness, suspension compliance, a current road wheel angle command, and a current steering torque command.

The path information may include coordinates of one or more waypoints the vehicle is to follow for a predetermined distance ahead of the vehicle, wherein the determining the center of vehicle rotation may be performed based on quasi steady-state approximation according to an equation:

$$O\left(-b+\frac{MV^2 a}{LC_r}, \frac{L+K_{us}V^2}{\delta}\right),$$

where O is a center of vehicle rotation, a is the vehicle length, b is the vehicle width, M is the vehicle mass, V is the vehicle forward velocity, L is a +b, $K_{us}$ is an understeer gradient, $C_r$ is constant corresponding to rear cornering stiffness, and δ corresponds to a road wheel angle command or a steering torque command.

The understeer gradient may be determined according to the equation $$K_{us} = \frac{M}{L}\left(\frac{b}{C_f} - \frac{a}{C_r}\right),$$

where $C_f$ corresponds to front cornering stiffness.

The minimizing the path tracking error may include setting a control goal according to a cost function $J(\delta)=J_L+J_\varphi \rightarrow \min$, where $J_L$ corresponds to a cost associated with a radial distance error, $J_\varphi$ corresponds to a cost associated with heading error, and δ corresponds to a road wheel angle command or a steering torque command.

$J_L$ may be determined according to an equation $$\frac{1}{N}\Sigma_{j=1}^{N} w_j \Delta L_i^2,$$

where N is a total number of waypoints, j corresponds to a waypoint, $w_j$ corresponds to a weight for a radial distance error, $\Delta L_i$ corresponds to a radial distance error.

$J_\varphi$ may be determined according to an equation $$\frac{1}{N}\Sigma_{j=1}^{N} w_j^\phi \Delta \phi_i^2,$$

where N is a total number of waypoints, j corresponds to a waypoint, $w_j^\phi$ corresponds to a weight for the heading error, $\Delta \phi_i$ corresponds to the heading error.

The determining the road wheel angle command or the steering torque command based on the minimized path tracking error may include using one-dimensional scalar function minimization.

The controlling the actuator according to the road wheel angle command or the steering torque command may include setting an electronic power steering module according to the road wheel angle command or according to the steering torque command.

According to an exemplary embodiment, an apparatus that controls lateral movement of a vehicle is provided. The apparatus includes at least one memory comprising computer executable instructions; and at least one processor configured to read and execute the computer executable instructions. The computer executable instructions may cause the at least one processor to receive vehicle information and path information of the vehicle, determine a center of vehicle rotation from the vehicle information, minimize a path tracking error based on the path information of the vehicle, determine a road wheel angle command or a steering torque command based on the minimized path tracking error by using non-linear optimization, and control an actuator according to the determined road wheel angle command or steering torque command.

The vehicle information may include one or more from among a vehicle length, a vehicle width, a vehicle mass, a vehicle forward velocity, an understeer gradient, vehicle cornering stiffness, a suspension compliance, a current road wheel angle command, and a current steering torque command.

The path information may include coordinates of one or more waypoints the vehicle is to follow for a predetermined distance ahead of the vehicle.

The computer executable instructions may cause the at least one processor to determine the center of vehicle rotation is performed based on quasi steady-state approximation according to an equation $$O\left(-b+\frac{MV^2 a}{LC_r}, \frac{L+K_{us}V^2}{\delta}\right),$$

where O is a center of vehicle rotation, a is the distance between vehicle center of gravity and front axle, b is the distance between vehicle center of gravity and rear axle, M is the vehicle mass, V is the vehicle forward velocity, L is a +b, $K_{us}$ is an understeer gradient, $C_r$ is constant corresponding to cornering stiffness, and δ corresponds to a road wheel angle command or a steering torque command.

The understeer gradient may be determined according to the equation $$K_{us} = \frac{M}{L}\left(\frac{b}{C_f} - \frac{a}{C_r}\right),$$

where $C_f$ corresponds to front cornering stiffness.

The computer executable instructions may cause the at least one processor to minimize the path tracking error by setting a control goal according to a cost function $J(\delta)=J_L + J_\varphi \rightarrow \min$, where $J_L$ corresponds to a cost associated with a radial distance error, $J_\varphi$ corresponds to a cost associated with heading error, and δ corresponds to a road wheel angle command or a steering torque command.

$J_L$ may be determined according to an equation $$\frac{1}{N}\Sigma_{j=1}^{N} w_j \Delta L_i^2,$$

where N is the total number of waypoints, j corresponds to a waypoint, $w_j$ corresponds to a weight for a radial distance error, $\Delta L_i$ corresponds to a radial distance error.

$J_\varphi$ may be determined according to an equation $$\frac{1}{N}\sum_{j=1}^{N} w_j^\phi \Delta \phi_i^2,$$

where N is the total number of waypoints, j corresponds to a waypoint, $w_j^\Phi$ corresponds to a weight for the heading error, $\Delta\phi_i$ corresponds to the heading error.

The computer executable instructions may cause the at least one processor to determine the road wheel angle command or the steering torque command based on the minimized path tracking error by using one-dimensional scalar function minimization.

The apparatus may include an electronic power steering module, and the computer executable instructions may cause the at least one processor to set the electronic power steering module according to the road wheel angle command or the steering torque command.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
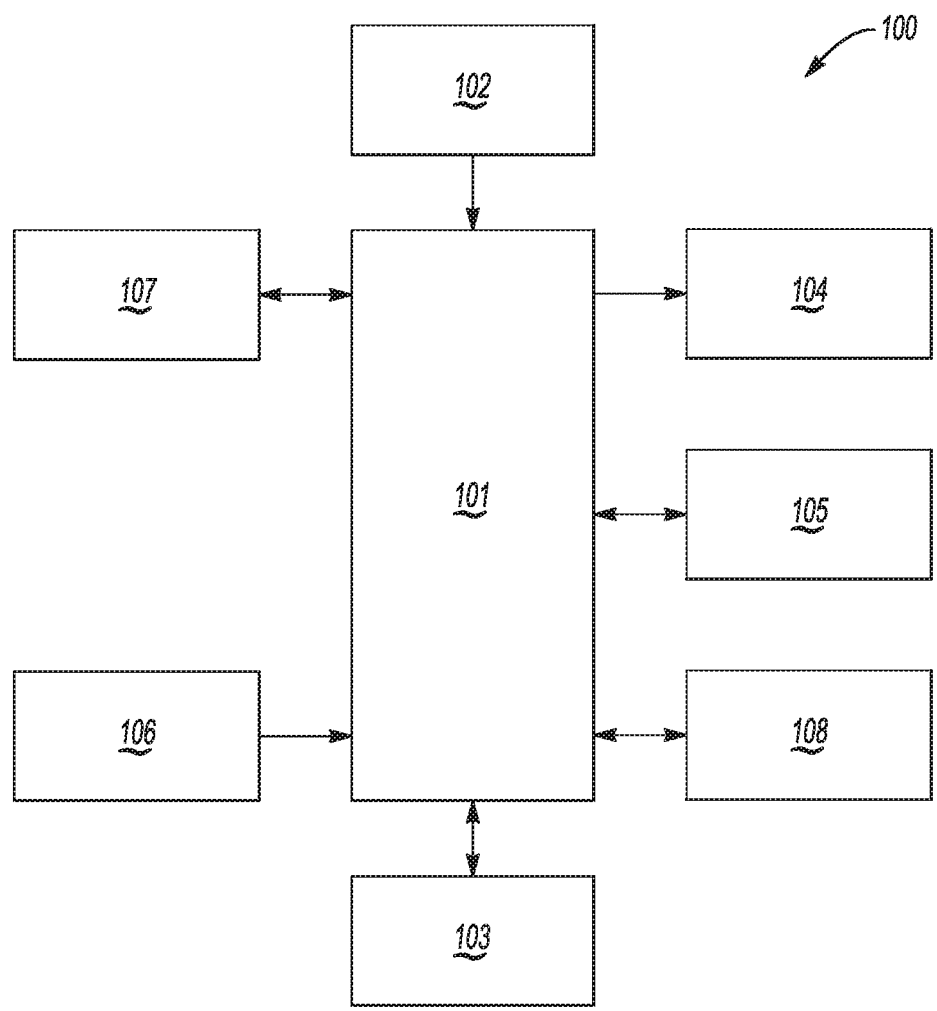
FIG. 1 shows a block diagram of an apparatus that controls lateral movement of a vehicle according to an exemplary embodiment.

An apparatus and method that control lateral movement will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with various automated controls and sensors that are capable of providing information used to determine a position or path of the vehicle and to control a vehicle to follow waypoints to arrive at a destination or maintain its position in road. However, methods of controlling the vehicle may not provide enough smoothness and accuracy when extended to mild paths. In addition, a kinematic model which provides high accuracy path tracking at low speeds may not be accurate for tracking paths at higher speeds.

A nonlinear control structure such as dynamic nonlinear circular regression may be used for performing mild lateral acceleration during automated maneuvers including lane centering, lane changes, turns, etc. The control structure allows for accurate path tracking in mild lateral acceleration maneuvers at all speeds including lane centering, lane changes, city driving. The control structure may apply a form of kinematic circular regression to account for the instant center of vehicle rotation shift during vehicle motion.

FIG. 1 shows a block diagram of an apparatus that controls lateral movement 100. As shown in FIG. 1, the apparatus that controls lateral movement 100, according to an exemplary embodiment, includes a controller 101, a power supply 102, a storage 103, an output 104, vehicle controls 105, a user input 106, a sensor 107, and a communication device 108. However, the apparatus that controls lateral movement 100 is not limited to the aforementioned configuration and may be configured to include additional elements and/or omit one or more of the aforementioned elements. The apparatus that controls lateral movement 100 may be implemented as part of a vehicle, as a standalone component, as a hybrid between an on vehicle and off vehicle device, or in another computing device.

The controller 101 controls the overall operation and function of the apparatus that controls lateral movement 100. The controller 101 may control one or more of a storage 103, an output 104, vehicle controls 105, a user input 106, a sensor 107, and a communication device 108 of the apparatus that controls lateral movement 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle controls 105, the user input 106, the sensor 107, and the communication device 108 of the apparatus that controls lateral movement 100. The information may be sent and received via a bus or network, or may be directly read or written to/from one or more of the storage 103, the output 104, the user input 106, the sensor 107, and the communication device 108 of the apparatus that controls lateral movement 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle controls 105, the user input 106, the sensor 107, and the communication device 108, of the apparatus that controls lateral movement 100. The power supply 102 may include one or more from among a battery, an outlet, a capacitor, a solar energy cell, a generator, a wind energy device, an alternator, etc.

The storage 103 is configured for storing information and retrieving information used by the apparatus that controls lateral movement 100. The storage 103 may be controlled by the controller 101 to store and retrieve information received from the controller 101, the vehicle controls 105, the sensor 107, and/or the communication device 108. The information may include path information and/or vehicle information. The storage 103 may also store the computer instructions configured to be executed by a processor to perform the functions of the apparatus that controls lateral movement 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The vehicle information may include one or more from among a vehicle length, a vehicle width, a vehicle mass, a vehicle forward velocity, an understeer gradient, vehicle cornering stiffness (for example, front and rear cornering stiffnesses), suspension compliances, torque information, a road wheel angle command, and a steering torque command. The path information may include coordinates of one or more waypoints the vehicle is to follow for a predetermined distance ahead of the vehicle.

In one example, the controller 101 may be used to convert a road wheel angle command to a steering torque command. Moreover, the cornering stiffnesses may be determined by calculating the inverse of front and rear cornering compliances and considering front and rear tire and rear suspension compliances. In another example, the torque information may be torque information of an electronic power steering device.

The output 104 outputs information in one or more forms including: visual, audible and/or haptic form. The output 104 may be controlled by the controller 101 to provide outputs to the user of the apparatus that controls lateral movement 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc. The output 104 may output notification including one or more from among an audible notification, a light notification, and a display notification. The notifications may indicate information on a position of a vehicle or a location of a vehicle.

The vehicle controls 105 may include vehicle system modules (VSMs) in the form of electronic hardware components that are located throughout the vehicle and typically receive input from one or more sensors and use the sensed input to perform diagnostic monitoring, control the vehicle to perform maneuvers, accelerate, brake, decelerate, report and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from external sensors 107 such as cameras, radars, LIDARs, and lasers, another VSM can be a powertrain control module that regulates operation of one or more components of the vehicle powertrain, another VSM can be the vehicle dynamics sensor that detects an understeer gradient, torque information, vehicle cornering stiffnesses and suspension compliances, a steering wheel angle parameter, a speed parameter such as a vehicle forward velocity, an acceleration parameter or command, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The user input 106 is configured to provide information and commands to the apparatus that controls lateral movement 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The sensor 107 may be configured to scan an area around a vehicle to detect and provide imaging information including an image of the area around the vehicle. The sensor 107 may be used to compile imaging information or mapping information or data may including three-dimensional point cloud information.

The communication device 108 may be used by the apparatus that controls lateral movement 100 to communicate with various types of external apparatuses according to various communication methods. The communication device 108 may be used to send/receive information including the information on a location of a vehicle, global navigation information, image sensor information and the adjustment information or adjustment value, etc.

The communication device 108 may include various communication modules such as one or more from among a telematics unit, a broadcast receiving module, a near field communication (NFC) module, a GNS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GNS receiver is a module that receives a GNS signal from a GPS satellite or other navigation satellite or tower and that detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that controls lateral movement 100 may be configured to receive vehicle information and path information of the vehicle, determine a center of vehicle rotation from the vehicle information, minimize a path tracking error based on the path information of the vehicle, determine a road wheel angle command using non-linear optimization based on the minimized path tracking error, and control an actuator according to the road wheel angle command.

The controller 101 of the apparatus that controls lateral movement 100 may be further configured to determine the center of vehicle rotation is performed based on quasi steady-state approximation according to an equation:

$$O\left(-b + \frac{MV^2 a}{LC_r}, \frac{L + K_{us}V^2}{\delta}\right),$$

where O is a center of vehicle rotation, a is the vehicle length, b is the vehicle width, M is the vehicle mass, V is the vehicle forward velocity, L is a vehicle wheelbase L=a+b, $K_{us}$ is an understeer gradient, $C_r$ is constant corresponding to a rear cornering stiffness, and $\delta$ corresponds to a road wheel angle command.

The controller 101 of the apparatus that controls lateral movement 100 may be configured to determine the understeer gradient according to the equation $$K_{us} = \frac{M}{L}\left(\frac{b}{C_f} - \frac{a}{C_r}\right),$$

where $C_f$ corresponds to front cornering stiffness.

The controller 101 of the apparatus that controls lateral movement 100 may be configured to control determine a lateral velocity gain α according to $$\alpha = b - \frac{MV^2 a}{LC_r}.$$

In addition, controller 101 of the apparatus that controls lateral movement 100 may be configured to control determine a road wheel angle gain β according to the equation $\beta = L + K_{us}V^2$. The instant turning radius $R_C$ may also be determined by the controller according to the equation $$R_C = \sqrt{\left(\frac{L + K_{us}V^2}{\delta}\right)^2 + \left(b - \frac{MV^2 a}{LC_r}\right)^2}.$$

The controller 101 of the apparatus that controls lateral movement 100 may be configured to minimize the path tracking error by setting a control goal according to a cost function $J(\delta) = J_L + J_\varphi \to \min$, where $J_L$ corresponds to a cost associated with a radial distance error, $J_\varphi$ corresponds to a cost associated with heading error, and $\delta$ corresponds to road wheel angle command.

$J_L$ may be determined according to an equation $$\frac{1}{N}\sum_{j=1}^{N} w_j \Delta L_i^2,$$

where N corresponds to a total number of waypoints, $w_j$ corresponds to a weight for a radial distance error at j waypoint number, $\Delta L_i$ corresponds to a radial distance error at j waypoint. $J_\varphi$ may be determined according to an equation $$\frac{1}{N}\sum_{j=1}^{N} w_j^\phi \Delta \phi_i^2,$$

where N corresponds to a total number of waypoints, $w_j^\Phi$ corresponds to a weight for the heading error at j waypoint, $\Delta \phi_i$ corresponds to the heading error at j waypoint.

The controller 101 of the apparatus that controls lateral movement 100 may be configured to determine the road wheel angle command using non-linear optimization based on the minimized path tracking error by using one-dimensional scalar function minimization. In addition, the controller 101 of the apparatus that controls lateral movement

100 may be configured to set the electronic power steering module according to the road wheel angle command.

Figure 2:
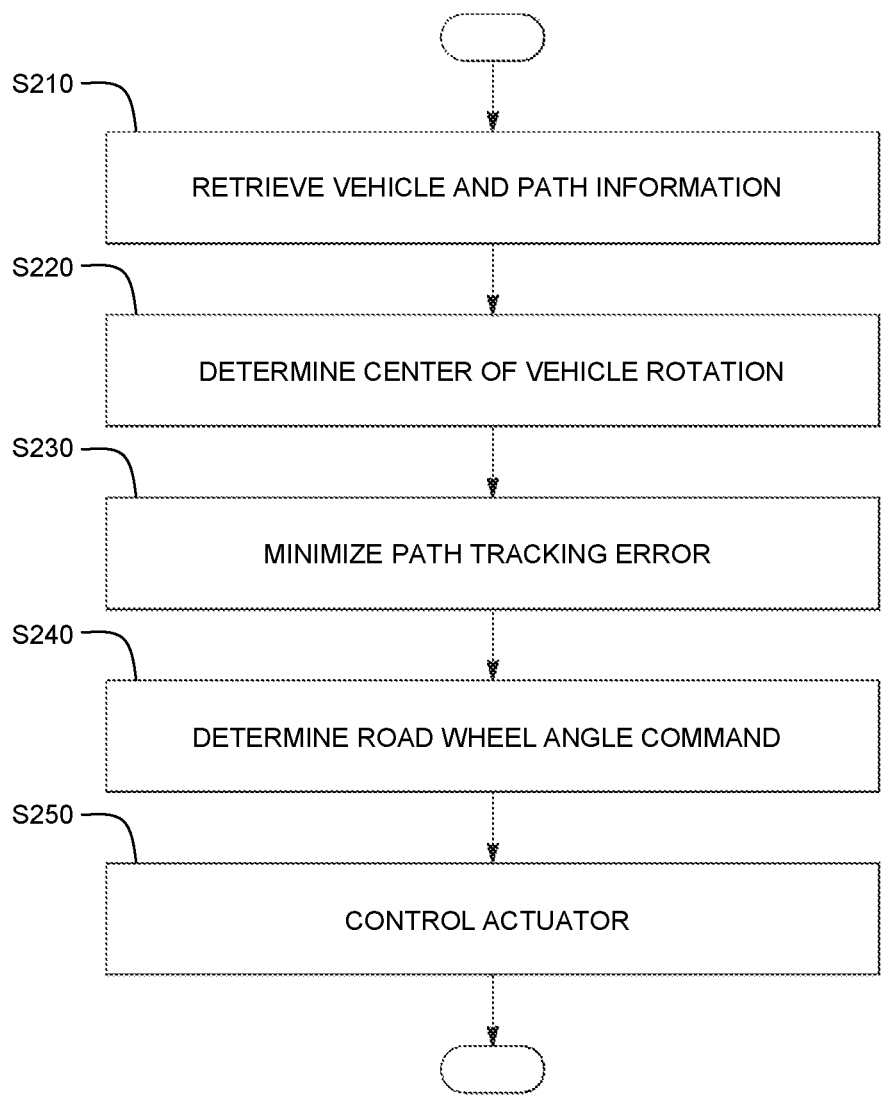
FIG. 2 shows a flowchart for a method that controls lateral movement of a vehicle according to an exemplary embodiment.

FIG. 2 shows a flowchart for a method that controls lateral movement according to an exemplary embodiment. The method of FIG. 2 may be performed by the apparatus that controls lateral movement 100 or may be encoded into a computer readable medium as instructions that are executable by a computer to perform the method.

Referring to FIG. 2, vehicle information and path information of the vehicle are retrieved or received in operation S210. In operation S220 a center of vehicle rotation is determined from the vehicle information. A path tracking error is minimized based on the path information of the vehicle in operation S230. Then, a road wheel angle command is determined based on the minimized path tracking error by using non-linear optimization in operation S240. Finally, an actuator is controlled according to the determined road wheel angle command.

Figure 3:
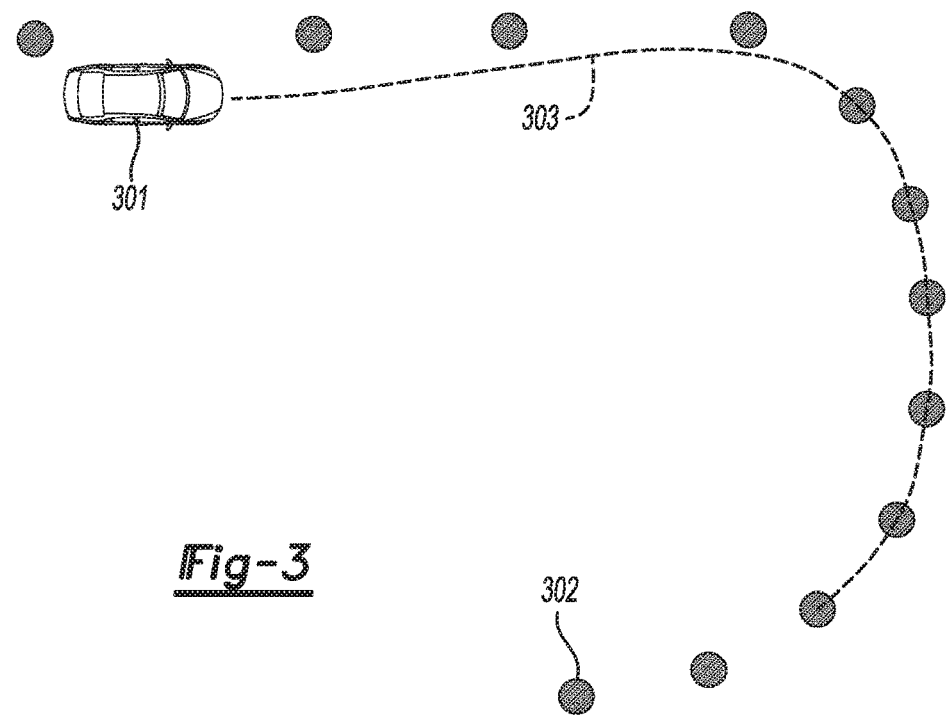
FIG. 3 shows an illustration of a vehicle and its path as it follows waypoints according to an aspect of an exemplary embodiment.

FIG. 3 shows an illustration of a vehicle and its path as it follows waypoints according to an aspect of an exemplary embodiment. Referring to FIG. 3, vehicle 301 is following waypoints 302. As the vehicle 301 traverses the waypoints the path 303 traveled may track more closely to the waypoints by applying the method and apparatus that controls lateral movement.

Figure 4:
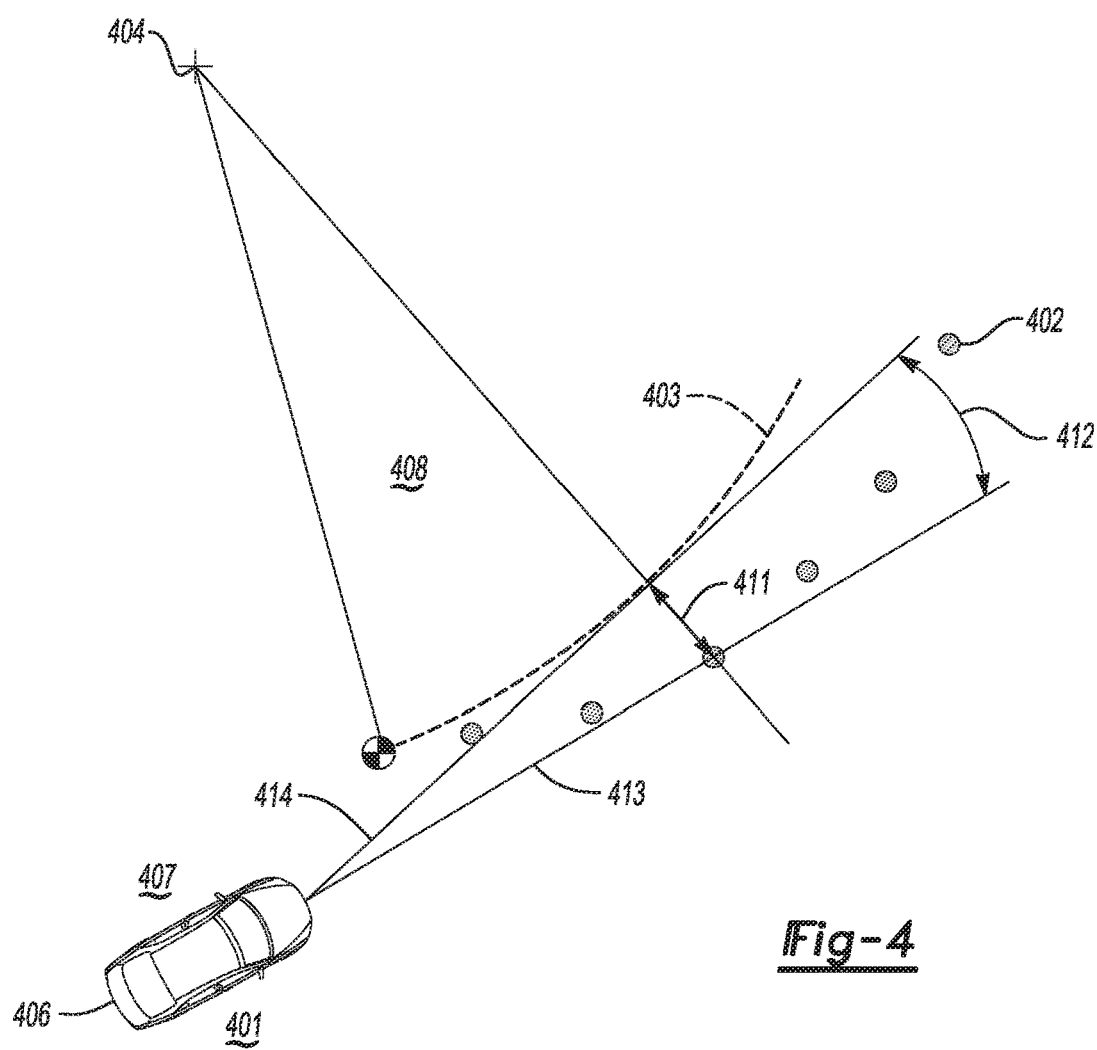
FIG. 4 shows an illustration of a center of rotation of vehicle and its path as it follows waypoints according to an aspect of an exemplary embodiment.

FIG. 4 shows an illustration of a center of rotation of vehicle and its path as it follows waypoints according to an aspect of an exemplary embodiment.

Referring to FIG. 4, a vehicle 401 has a length 407 and width 406 as well as a current road wheel angle 405 associated with the vehicle. As the vehicle traverses waypoints 402, the path 403 can be approximated with a circular arc. Based on this information the center of rotation 404 of the vehicle can be determined as well as the distance 408 from the center of rotation. The center of rotation 404 and distance form the center of rotation can then be used to adjust the road wheel angle 405 to better fit the path of the vehicle to waypoints 402.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that controls lateral movement of a vehicle, the method comprising:
receiving vehicle information and path information of the vehicle;
determining a center of vehicle rotation from the vehicle information;
minimizing a path tracking error based on the path information of the vehicle;
determining a road wheel angle command or a steering torque command based on the minimized path tracking error by using non-linear optimization; and
controlling an actuator according to the determined road wheel angle command or steering torque command;
wherein the determining the center of vehicle rotation is performed based on quasi steady-state approximation according to an equation:

$$O\left(-b + \frac{MV^2 a}{LC_r}, \frac{L + K_{us}V^2}{\delta}\right),$$

where O is a center of vehicle rotation, a is the vehicle length, b is the vehicle width, M is the vehicle mass, V is the vehicle forward velocity, L is a +b, $K_{us}$ is an understeer gradient, $C_r$ is constant corresponding to rear cornering stiffness, and δ corresponds to a road wheel angle command or a steering torque command.

2. The method of claim 1, wherein the vehicle information comprises one or more from among a vehicle length, a vehicle width, a vehicle mass, a vehicle forward velocity, an understeer gradient, vehicle cornering stiffness, suspension compliance, a current road wheel angle command, and a current steering torque command.

3. The method of claim 1, wherein the path information comprises coordinates of one or more waypoints the vehicle is to follow for a predetermined distance ahead of the vehicle.

4. The method of claim 1, wherein the understeer gradient is $$K_{us} = \frac{M}{L}\left(\frac{b}{C_f} - \frac{a}{C_r}\right),$$

determined according to the equation where $C_f$ corresponds to front cornering stiffness.

5. The method of claim 1, wherein the minimizing the path tracking error comprises setting a control goal according to a cost function $J(\delta) = J_L + J_\varphi \rightarrow \min$, where $J_L$ corresponds to a cost associated with a radial distance error, $J_\varphi$ corresponds to a cost associated with heading error, and δ corresponds to a road wheel angle command or a steering torque command.

6. The method of claim 1, wherein the determining the road wheel angle command or the steering torque command based on the minimized path tracking error comprises using one-dimensional scalar function minimization.

7. The method of claim 1, wherein the controlling the actuator according to the road wheel angle command or the steering torque command comprises setting an electronic power steering module according to the road wheel angle command or according to the steering torque command.

8. A method that controls lateral movement of a vehicle, the method comprising:
   receiving vehicle information and path information of the vehicle;
   determining a center of vehicle rotation from the vehicle information;
   minimizing a path tracking error based on the path information of the vehicle;
   determining a road wheel angle command or a steering torque command based on the minimized path tracking error by using non-linear optimization; and
   controlling an actuator according to the determined road wheel angle command or steering torque command;
   wherein the minimizing the path tracking error comprises setting a control goal according to a cost function $J(\delta)=J_L+J_\varphi \rightarrow \min$, where $J_L$ corresponds to a cost associated with a radial distance error, $J_{100}$, corresponds to a cost associated with heading error, and $\delta$ corresponds to a road wheel angle command or a steering torque command;
   wherein $J_L$ is determined according to an equation $$\frac{1}{N}\sum_{j=1}^{N} w_j \Delta L_i^2,$$

where N is a total number of waypoints, j corresponds to a waypoint, $w_j$ corresponds to a weight for a radial distance error, $\Delta L_i$ corresponds to a radial distance error.

9. A method that controls lateral movement of a vehicle, the method comprising:
   receiving vehicle information and path information of the vehicle;
   determining a center of vehicle rotation from the vehicle information;
   minimizing a path tracking error based on the path information of the vehicle;
   determining a road wheel angle command or a steering torque command based on the minimized path tracking error by using non-linear optimization; and
   controlling an actuator according to the determined road wheel angle command or steering torque command;
   wherein the minimizing the path tracking error comprises setting a control goal according to a cost function $J(\delta)=J_L+J_\varphi \rightarrow \min$, where $J_L$ corresponds to a cost associated with a radial distance error, $L_\varphi$, corresponds to a cost associated with heading error, and $\delta$ corresponds to a road wheel angle command or a steering torque command;
   wherein $J_\varphi$ is determined according to an equation $$\frac{1}{N}\sum_{j=1}^{N} w_j^\phi \Delta \phi_i^2,$$

where N is a total number of waypoints, j corresponds to a waypoint, $w_j^\Phi$ corresponds to a weight for the heading error, $\Delta\phi_i$ corresponds to the heading error.

10. An apparatus that controls lateral movement of a vehicle, the apparatus comprising:
   at least one memory comprising computer executable instructions; and
   at least one processor configured to read and execute the computer executable instructions, the computer executable instructions causing the at least one processor to:
      receive vehicle information and path information of the vehicle;
      determine a center of vehicle rotation from the vehicle information;
      minimize a path tracking error based on the path information of the vehicle;
      determine a road wheel angle command or a steering torque command based on the minimized path tracking error by using non-linear optimization; and
      control an actuator according to the determined road wheel angle command or steering torque command;
   wherein the path information comprises coordinates of one or more waypoints the vehicle is to follow for a predetermined distance ahead of the vehicle; and
   wherein the computer executable instructions cause the at least one processor to determine the center of vehicle rotation is performed based on quasi steady-state approximation according to an equation:

$$O\left(-b+\frac{MV^2 a}{LC_r}, \frac{L+K_{us}V^2}{\delta}\right),$$

where O is a center of vehicle rotation, a is the distance between vehicle center of gravity and front axle, b is the distance between vehicle center of gravity and rear axle, M is the vehicle mass, V is the vehicle forward velocity, L is a +b, $K_{us}$ is an understeer gradient, $C_r$ is constant corresponding to cornering stiffness, and $\delta$ corresponds to a road wheel angle command or a steering torque command.

11. The apparatus of claim 10, wherein the vehicle information comprises one or more from among a vehicle length, a vehicle width, a vehicle mass, a vehicle forward velocity, an understeer gradient, vehicle cornering stiffness, a suspension compliance, a current road wheel angle command, and a current steering torque command.

12. The apparatus of claim 10, wherein the understeer gradient is determined according to the equation $$K_{us} = \frac{M}{L}\left(\frac{b}{C_f} - \frac{a}{C_r}\right),$$

where $C_f$ corresponds to front cornering stiffness.

13. The apparatus of claim 12, wherein the computer executable instructions cause the at least one processor to minimize the path tracking error by setting a control goal according to a cost function $J(\delta)=J_L+J_\varphi \rightarrow \min$, where $J_L$ corresponds to a cost associated with a radial distance error, $J_\varphi$ corresponds to a cost associated with heading error, and $\delta$ corresponds to a road wheel angle command or a steering torque command.

14. The apparatus of claim 13, wherein $J_L$ is determined according to an equation $$\frac{1}{N}\sum_{j=1}^{N} w_j \Delta L_i^2,$$

where N is the total number of waypoints, j corresponds to a waypoint, $w_j$ corresponds to a weight for a radial distance error, $\Delta L_i$ corresponds to a radial distance error.

15. The apparatus of claim 13, wherein $J_\varphi$ is determined according to an equation $$\frac{1}{N}\sum_{j=1}^{N} w_j^\phi \Delta\phi_i^2,$$

where N is the total number of waypoints, j corresponds to a waypoint, $w_j^\phi$ corresponds to a weight for the heading error, $\Delta\phi_i$ corresponds to the heading error.

16. The apparatus of claim 10, wherein the computer executable instructions cause the at least one processor to determine the road wheel angle command or the steering torque command based on the minimized path tracking error by using one-dimensional scalar function minimization.

17. The apparatus of claim 10, further comprising an electronic power steering module,
   wherein the computer executable instructions cause the at least one processor to set the electronic power steering module according to the road wheel angle command or the steering torque command.

18. A method that controls lateral movement of a vehicle, the method comprising:
   receiving vehicle information and path information of the vehicle;
   determining a center of vehicle rotation from the vehicle information based on a quasi steady-state approximation;
   minimizing a path tracking error based on the path information of the vehicle;
   determining a road wheel angle command or a steering torque command based on the minimized path tracking error by using non-linear optimization; and
   controlling an actuator according to the determined road wheel angle command or steering torque command;
   wherein the minimizing the path tracking error comprises setting a control goal according to a cost function $J(\delta)=J_L+J_\varphi \to \min$, where $J_L$ corresponds to a cost associated with a radial distance error, $J_\varphi$ corresponds to a cost associated with heading error, and $\delta$ corresponds to a road wheel angle command or a steering torque command;
   wherein $J_L$ is determined according to an equation $$\frac{1}{N}\sum_{j=1}^{N} w_j \Delta L_i^2,$$

where N is a total number of waypoints, j corresponds to a waypoint, $w_j$ corresponds to a weight for a radial distance error, $\Delta L_i$ corresponds to a radial distance error; and
   wherein $J_\varphi$ is determined according to an equation $$\frac{1}{N}\sum_{j=1}^{N} w_j^\phi \Delta\phi_i^2,$$

where N is a total number of waypoints, j corresponds to a waypoint, $w_j^\phi$ corresponds to a weight for the heading error, $\Delta\phi_i$ corresponds to the heading error.

* * * * *